(12) United States Patent
Brüntrup et al.

(10) Patent No.: US 6,691,811 B2
(45) Date of Patent: Feb. 17, 2004

(54) SAFETY CONFIGURATION FOR AN APPARATUS THAT CAN BE MOVED OVER A SURFACE

(75) Inventors: Thomas Brüntrup, Kissing (DE); Joachim Damrath, Bachhagel (DE); Jürgen Konrad, Ulm/Donau (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/164,788

(22) Filed: Jun. 7, 2002

(65) Prior Publication Data

US 2003/0009844 A1 Jan. 16, 2003

Related U.S. Application Data

(63) Continuation of application No. PCT/EP00/10849, filed on Nov. 3, 2000.

(30) Foreign Application Priority Data

Dec. 7, 1999 (DE) .......................... 199 58 890

(51) Int. Cl.$^7$ ................................. B60V 1/11
(52) U.S. Cl. ................. 180/164; 180/901; 114/222
(58) Field of Search .............. 180/7.1, 164, 119, 180/129, 901; 15/301, 302, 319, 340.1, 1.7, 49.1, 50.1, 103; 114/222; 294/64.1; 414/591, 594, 627, 749.1

(56) References Cited

U.S. PATENT DOCUMENTS

| | | | | |
|---|---|---|---|---|
| 1,117,548 A | * | 11/1914 | Bouchery | ................... 248/362 |
| 4,708,381 A | * | 11/1987 | Lundback | ................... 294/64.1 |
| 4,777,971 A | * | 10/1988 | Tribout et al. | ................ 269/21 |
| 5,427,363 A | * | 6/1995 | Rink et al. | .................. 405/191 |
| 5,730,553 A | * | 3/1998 | Miura et al. | ................. 114/222 |
| 5,852,984 A | * | 12/1998 | Matsuyama et al. | ........ 114/313 |
| 5,947,051 A | * | 9/1999 | Geiger | ........................ 114/313 |

FOREIGN PATENT DOCUMENTS

| | | | |
|---|---|---|---|
| DE | 198 35 038 C1 | 7/1999 | |
| EP | 0 505 956 A1 | 9/1992 | |
| JP | 59 220 468 | 12/1984 | |
| JP | 02037091 A | * 2/1990 | ......... B62D/57/024 |
| JP | 03 294 189 | 12/1991 | |
| JP | 05 049 554 | 3/1993 | |

* cited by examiner

*Primary Examiner*—Lesley D. Morris
*Assistant Examiner*—Daniel Yeagley
(74) *Attorney, Agent, or Firm*—Laurence A. Greenberg; Werner H. Stemer; Ralph E. Locher

(57) ABSTRACT

An apparatus that attaches itself to a surface by negative pressure and that can move over the surface, in particular, for carrying out work, to prevent a risk, depending on the alignment of the surface, of the apparatus dropping downward if there is a decrease in an attachment force in the case of malfunctioning includes a safety configuration that monitors detachment of the apparatus from the surface and, in such a case, attaches a retaining configuration, preferably in the form of a suction cup, to the surface, the retaining configuration retaining the movable apparatus on the surface.

18 Claims, 1 Drawing Sheet

SAFETY CONFIGURATION FOR AN APPARATUS THAT CAN BE MOVED OVER A SURFACE

CROSS-REFERENCE TO RELATED APPLICATION

This application is a continuation of copending International Application No. PCT/EP00/10849, filed Nov. 3, 2000, which designated the United States and was not published in English.

BACKGROUND OF THE INVENTION

FIELD OF THE INVENTION

The invention relates to an apparatus that can be moved over a surface and, for attachment to the surface, produces negative pressure between it and the surface, and has a safety configuration that monitors detachment from the surface.

Devices that can produce an attachment force to a surface by negative pressure and, as such, can also move along slanting or vertically upright surfaces exist in the prior art. Such apparatuses are used, in particular, for the purpose of carrying out work on barely accessible surfaces, for example, for cleaning the exterior surfaces of large structures. There is a risk here, however, of the device for producing the attachment force to the surface failing and of the apparatus detaching from the surface.

European Patent Application EP 0 505 956 A1 discloses such an apparatus, in which a winch with a safety line, on which the apparatus is suspended, is provided at the top of the building as a safety configuration. As soon as the apparatus is detached from the building facade, the winch is locked. As a result, the apparatus cannot drop downward. Such a configuration has the disadvantage, in particular, that the apparatus has to be suspended on the safety line before it is ready for operation, and that, furthermore, it is necessary to have an additional installation on the building. In addition, the region of action of the apparatus is restricted by the necessary safety line. As a result, the apparatus cannot operate autonomously.

SUMMARY OF THE INVENTION

It is accordingly an object of the invention to provide a safety configuration for an apparatus that can be moved over a surface that overcomes the hereinafore-mentioned disadvantages of the heretofore-known devices of this general type and that can move completely freely over the surface and that can be prevented from dropping downward.

With the foregoing and other objects in view, there is provided, in accordance with the invention, an apparatus to be moved over a surface including a housing assembly, a negative pressure generator for removably attaching the housing assembly to the surface, the negative pressure generator generating negative pressure between the housing assembly and the surface, a safety configuration monitoring detachment of the housing assembly from the surface by monitoring a distance between a portion of the housing assembly and the surface, a retaining configuration connected to the housing assembly, and if the housing assembly becomes detached from the surface, the safety configuration attaching the retaining configuration to the surface to retain the housing assembly on the surface.

The apparatus according to the invention has a retaining configuration that, in the event of detachment from the surface, is attached to the surface by the safety configuration and that retains the movable apparatus on the surface. As such, there is no need for any external configuration that restricts the freedom of movement of the apparatus and constitutes additional outlay in respect of the installation.

For the purpose of monitoring detachment of the apparatus from the surface, the safety configuration can monitor the distance between the apparatus and the surface. Any prior art distance-measuring method can be used for such a purpose.

In accordance with another feature of the invention, the apparatus advantageously has at least one traveling mechanism that can be moved in relation to the apparatus, and the safety configuration monitors the distance between the traveling mechanism and the apparatus to monitor detachment from the surface. Such a traveling mechanism is usually present anyway for retaining the apparatus at a predefined distance from the surface and to make possible movement of the apparatus over the surface. For such a purpose, a drive unit can be associated with at least one traveling mechanism. The at least one traveling mechanism can be connected to the apparatus such that, without any external influences, it is forced away from the apparatus by a slight spring force and, when the apparatus is attached by suction to the surface, it is forced in against a stop. As a result, the apparatus is retained at the predefined distance from the surface. If the attachment force decreases below a certain value, the traveling mechanism can be forced away from the apparatus again. As a result, its distance from the apparatus increases and the safety configuration responds.

For the purpose of detecting detachment from the surface, in accordance with a further feature of the invention, the safety configuration can also monitor the negative pressure between the apparatus and the surface. Because the negative pressure, or the difference between the ambient pressure and the pressure between the apparatus and the surface, is a direct measure of the attachment force, it is, thus, possible to detect any change in the attachment force. As such, it is possible to establish any increase in this risk even before the apparatus is detached from the surface. In addition, by monitoring the negative pressure and, thus, the attachment force, it is also possible to detect the case where, with reduced attachment force, although the apparatus does not move away from the surface, there is such a reduction in friction of a drive unit of the apparatus on the surface that, if the surface is in a slanting or vertical position, the apparatus may slip off.

In accordance with an added feature of the invention, the retaining configuration has at least one suction cup. After having pressure exerted on the suction cups once, it is possible for suction cups, when used on smooth surfaces, which in any case is the exclusive, or at least preferred, field of application of apparatuses that adhere by negative pressure, to retain large loads over a relatively long period of time without additional measures being necessary to maintain these retaining forces. To ensure a better hold even over a relatively long period of time, it is possible to provide a configuration for exerting more pressure on a suction cup attached to the surface. For example, it is possible for the suction cup to be struck at regular intervals. Furthermore, it is also conceivable for air to be pumped out of an attached suction cup regularly or continuously to maintain the negative pressure necessary for attachment purposes.

In accordance with an additional feature of the invention, the retaining configuration may also have at least one adhesive-bonding device. It is possible for the bonding, itself, to be of a flexible and adhering material or to be coated with an adhesive. It is preferable here to make use of an adhesive that can be removed from the surface without leaving any residues. The use of an adhesive attachment surface or an adhesive as the retaining configuration has the advantage, in particular, that, up to a certain degree, it is possible to tolerate unevenesses in the surface.

The above mentioned embodiments for the retaining configuration and for monitoring detachment from the surface can also be used in combination in each case to achieve a higher degree of safety.

To make possible removal of the apparatus again following response of the safety configuration, in accordance with yet another feature of the invention, there is provided a device that can be actuated from the outside and is intended for releasing the retaining configuration from the surface.

Preferably, the device is located in the interior of the apparatus. In the case of a suction cup as retaining configuration, the release device may be configured such that air can be let into the interior of the suction cup, for example, with the aid of a tab, by which the border of the suction cup can be detached to some extent. If an adhesive surface is used as the retaining configuration, it is possible to use a lever mechanism, by which the retaining configuration can be lifted off from the surface. It is also possible for the retaining configuration to be checked before operation in each case by the apparatus with the retaining configuration being positioned on the surface, the apparatus then automatically firmly attaching itself by suction and the retaining configuration detaching itself again.

In accordance with yet a further feature of the invention, the apparatus is connected to the retaining configuration by a rope such that the apparatus can be lowered from the retaining configuration. The configuration makes it possible to prevent the situation where, when the safety configuration is triggered, the apparatus is secured at an inaccessible or barely accessible location and can only be retrieved with very high outlay. For such a purpose, the apparatus may be connected to the retaining configuration through a safety line that is unwound once the safety configuration has been triggered. As a result, the apparatus moves downward slowly.

The unwinding of the safety line and/or the lowering of the apparatus may also be triggered by an external command, for example, by remote control. The retaining configuration here is advantageously configured such that it can also be released from the surface remotely. For such a purpose, alongside the safety line, on which the apparatus is lowered, a further line is unwound. By pulling the further line, it is possible for the retaining configuration to be released from the surface.

For the purpose of attaching the retaining configuration to the surface, in accordance with yet an added feature of the invention, there is provided a prestressable spring element. It is, thus, possible, regardless of the energy provided in the apparatus, to supply a large quantity of mechanical energy that can be used in an extremely short period of time for attaching the retaining configuration. Furthermore, it is also possible to achieve the situation where the safety configuration including the retaining configuration can function without auxiliary energy. As a result, safety is ensured even in the event of complete failure of the energy supply of the apparatus. For such a purpose, it is possible for the distance from the surface and/or the negative pressure to be monitored, and for the prestressable spring element for the retaining configuration to be triggered, in a purely mechanical way. To avoid operation of the apparatus when the safety configuration cannot be used, it is possible to make provision for the apparatus only to be operable when the spring element is subjected to stressing.

In accordance with a concomitant feature of the invention, the apparatus has a signaling configuration that is activated in the event of detachment from the surface. Thus, a fault may be indicated in an optical and/or acoustical way. At the same time, upon response of the safety configuration, it is possible to interrupt the operation of the apparatus, which is used, for example, as a piece of cleaning equipment.

The safety configuration according to the invention may also serve as a theft-prevention device against unauthorized removal of an apparatus that can be moved over a surface, for which purpose the device for releasing the retaining configuration is advantageously configured such that it cannot be actuated by unauthorized individuals because it is secured, for example, by a lock or a secret code combination.

Other features that are considered as characteristic for the invention are set forth in the appended claims.

Although the invention is illustrated and described herein as embodied in a safety configuration for an apparatus that can be moved over a surface, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
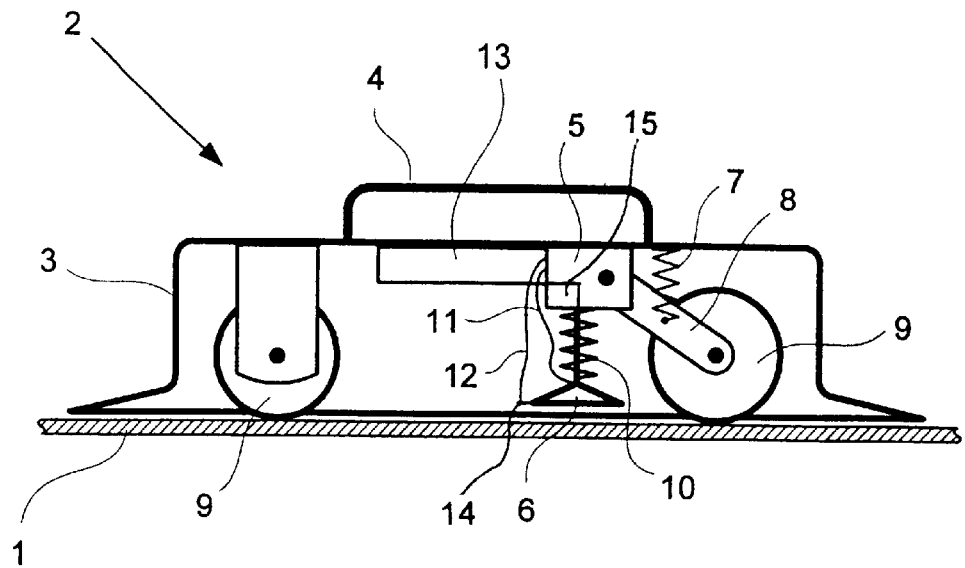
FIG. 1 is a diagrammatic cross-sectional view through an apparatus according to the invention.
Figure 2:
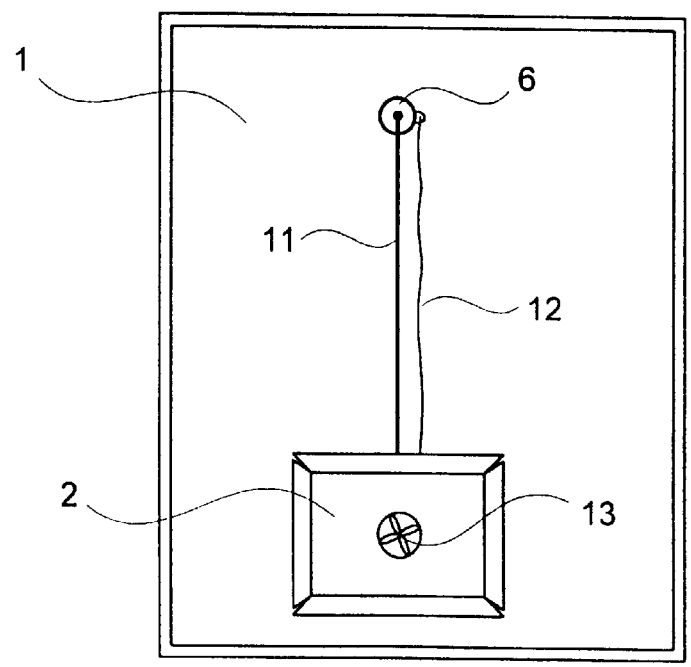
FIG. 2 is a plan view of the apparatus of FIG. 1 lowered from a triggered retaining configuration.

Referring now to the figures of the drawings in detail and first, particularly to FIG. 1 thereof, there is shown the apparatus 2 according to the invention in an operating position on a surface 1. The apparatus 2 has a housing 3, on the top side of which a handle 4 and a negative-pressure blower 13 are disposed. The housing 3 is in the form of a half-shell that, together with the surface 1, can form a cavity that is substantially sealed in relation to the surroundings. For such a purpose, a non-illustrated skirt may be disposed on the borders of the housing 3, the skirt butting under slight pressure against the surface 1. The negative-pressure blower 13 can produce a negative pressure in the interior of the housing 3, the apparatus 2 being pressed onto the surface 1 by the negative pressure.

Fastened inside the housing 3 are four wheels 9, on which the apparatus 2 can roll at a defined distance over the surface 1. A roller 9 that is disposed on the right-hand side in FIG. 1 is disposed at the end of a rocker 8, which is articulated on a safety configuration 5 connected to the housing 3. Provided between the housing 3 and the rocker 8 is a spring 7 that forces the rocker 8 outward, in particular, towards the surface 1.

The safety configuration 5, furthermore, has a retaining configuration 6 in the form of a suction cup that can be pressed against the surface 1 by a prestressed spring 10. Fastened on the suction cup 6 is one end of a safety line 11 that is wound up on a non-illustrated winch within the safety configuration 5. Furthermore, the suction cup 6 has, on a border, a tab 14 that can simply be pulled to raise the border of the suction cup 6 to some extent to make possible another releasing following attachment to the surface 1. Fastened on the tab 14 of the suction cup 6 is one end of a release line 12, which is likewise wound up on another non-illustrated winch in the safety configuration 5.

The safety configuration 5 further includes a non-illustrated first locking configuration, which retains the spring 10 in the stressed state once the spring 10 has been subjected to stressing. When the rocker 8 is swung into the housing 3, the first locking configuration is unlocked, in which case the spring 10 is retained in the stressed state by a non-illustrated second locking configuration that is dependent on the position of the rocker 8. Such a configuration achieves a situation where, prior to the apparatus 2 being positioned on the surface 1, if the rocker 8 is retained in a pivoted-out state by the spring 7, the spring 10 can be subjected to stressing by the operator, whereupon it is retained by the first locking configuration. The apparatus 2 can then be positioned on the surface 1. As a result, the rocker 8 is pivoted inward counter to the action of the spring 7. Accordingly, the first locking configuration unlocks and the spring 10 is retained by the second locking configuration, which is dependent on the position of the rocker 8. If, in the case of a fault, there is a reduction in the contact pressure of the apparatus 2 on the surface 1, and the housing 3 moves away from the surface 1, the rocker 8 can be pivoted outward again by the spring 7. As a result, the second locking configuration unlocks and the suction cup 6 is forced against the surface 1 by the spring 10. As soon as the safety configuration 5 has triggered, a signal transmitter 15 emits an acoustic signal to draw attention to the fault.

The winch for the safety line 11 is configured to unwind when subjected to pulling, a speed-dependent brake only allowing the winch to unwind slowly. The winch for the release line 12 is connected to the winch for the safety line 11 such that it likewise unwinds when the winch for the safety line 11 unwinds.

To move the apparatus into its operating position with the safety configuration activated, in the removed state, the suction cup 6 is pressed in and the associated spring 10 is, thus, subjected to stressing, the rocker 8 being retained in a pivoted-out position by the spring 7. The spring 10 is retained in the stressed state by the first locking configuration. The apparatus 2 is then positioned on the surface 1. As a result, the rocker 8 is forced downward. In such a case, the first locking configuration is released and the spring 10 is retained by the second locking configuration, which is connected to the rocker 8. For starting up once placed in position, the negative-pressure blower 13 is switched on and produces a negative pressure in the housing 3, thus ensuring the attachment of the apparatus 2 to the surface 1.

If then, in the case of malfunctioning, the attachment force of the apparatus 2 to the surface 1 decreases, for example, as a result of the negative-pressure blower 13 failing, and the apparatus 2 moves away from the surface 1, the spring 7 forces the rocker 8 outward. As a result, the second locking configuration unlocks and releases the spring 10 and, thus, the suction cup 6. The suction cup 6 is pressed onto the surface 1 and adheres there. If the apparatus 2 cannot be retained on the surface 1 without the negative pressure, for example, because the surface 1 is vertical, its weight will pull on the safety line 11, through which it is connected to the suction cup 6. Under the pulling, the winch for the safety line 11 begins to unwind in a braked manner. As a result, the apparatus 2 is lowered slowly. The release line 12 is unwound at the same time, the line 12 being of a correspondingly longer dimension. As a result, it is not subjected to any pulling during and after the lowering operation.

To remove the suction cup 6 from the surface 1, all that is required is for an operator to pull the tab 14 on the border. The pulling can also take place by virtue of pulling the release line 12, if the suction cup 6 is out of reach.

We claim:

1. An apparatus to be moved over a surface, comprising:
   a housing assembly;
   a negative pressure generator for removably attaching said housing assembly to the surface, said negative pressure generator generating negative pressure between said housing assembly and the surface;
   a safety configuration monitoring detachment of said housing assembly from the surface by monitoring a safety distance between a portion of said housing assembly and the surface;
   a retaining configuration connected to said housing assembly; and
   if said housing assembly detaches from the surface greater than said safety distance, said safety configuration being configured to attach said retaining configuration to the surface to retain said housing assembly on the surface.

2. The apparatus according to claim 1, including at least one traveling mechanism movable with respect to said housing assembly, said safety configuration monitoring detachment from the surface by monitoring a distance between said traveling mechanism and said housing assembly.

3. The apparatus according to claim 1, wherein said safety configuration monitors the negative pressure between said housing assembly and the surface.

4. The apparatus according to claim 1, wherein said retaining configuration has at least one suction cup.

5. The apparatus according to claim 4, including a pressure configuration for exerting pressure on said suction cup attached to the surface, said pressure configuration connected to said suction cup.

6. The apparatus according to claim 1, wherein said retaining configuration has at least one adhesive-bonding device.

7. The apparatus according to claim 1, wherein said retaining configuration has means for adhesively bonding said housing assembly to the surface.

8. The apparatus according to claim 1, wherein:
   said housing assembly has an interior;
   a releasing device for releasing said retaining configuration from the surface is disposed in said interior and is connected to said retaining configuration; and
   said releasing device releases said retaining configuration from outside said housing assembly.

9. The apparatus according to claim 1, wherein:
   said housing assembly has an interior;
   a releasing device for releasing said retaining configuration from the surface is disposed in said interior and is connected to said retaining configuration; and
   said releasing device is to be actuated from outside said housing assembly.

10. The apparatus according to claim 1, wherein said retaining configuration has a line for lowering said housing assembly.

11. The apparatus according to claim 10, wherein said line lowers said housing assembly from said retaining configuration.

12. The apparatus according to claim 10, wherein said line is a rope.

13. The apparatus according to claim 10, wherein said line is attached to said housing assembly.

14. The apparatus according to claim 1, wherein said retaining configuration has a prestressable spring element for attaching said retaining configuration to the surface.

15. The apparatus according to claim 1, including a prestressable spring element for attaching said retaining configuration to the surface, said spring element attached to said retaining configuration.

16. The apparatus according to claim 1, wherein said safety configuration has a signaling apparatus signaling detachment of said housing assembly from the surface.

17. The apparatus according to claim 1, including a signaling apparatus for signaling detachment of said housing assembly from the surface, said signaling apparatus connected to said safety configuration.

18. An apparatus to be moved over a surface, comprising:

a housing assembly;

a negative pressure generator for removably attaching said housing assembly to the surface, said negative pressure generator generating negative pressure between said housing assembly and the surface;

a safety configuration configured to monitor detachment of said housing assembly from the surface by monitoring a safety distance between a portion of said housing assembly and the surface and to output a safety signal when a monitored distance between said portion of said housing assembly and the surface is at least as great as said safety distance;

a retaining configuration connected to said housing assembly and communicating with said safety configuration; and said safety configuration being configured to attach said retaining configuration to the surface to retain said housing assembly on the surface dependent upon receipt of said safety signal.

* * * * *